(12) United States Patent
Bellocchio et al.

(10) Patent No.: US 9,069,953 B2
(45) Date of Patent: Jun. 30, 2015

(54) METHOD FOR CHECKING DATA CONSISTENCY IN A SYSTEM ON CHIP

(75) Inventors: Marc Bellocchio, Aubagne (FR); Christophe Gogniat, Romanel-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 766 days.

(21) Appl. No.: 13/064,262

(22) Filed: Mar. 15, 2011

(65) Prior Publication Data

US 2011/0231709 A1    Sep. 22, 2011

(30) Foreign Application Priority Data

Mar. 19, 2010    (EP) ..................................... 10157014

(51) Int. Cl.
*G06F 11/00* (2006.01)
*G06F 21/55* (2013.01)
*G06F 21/75* (2013.01)

(52) U.S. Cl.
CPC ............... *G06F 21/55* (2013.01); *G06F 21/75* (2013.01)

(58) Field of Classification Search
USPC .......................................................... 714/10
See application file for complete search history.

(56) References Cited

U.S. PATENT DOCUMENTS

| | | | |
|---|---|---|---|
| 5,915,082 A | 6/1999 | Marshall et al. | |
| 6,199,171 B1 | 3/2001 | Bossen et al. | |
| 6,604,177 B1 | 8/2003 | Kondo et al. | |
| 6,615,366 B1 * | 9/2003 | Grochowski et al. | 714/10 |
| 6,839,849 B1 | 1/2005 | Ugon et al. | |
| 7,814,378 B2 * | 10/2010 | Manovit et al. | 714/718 |
| 2003/0206627 A1 * | 11/2003 | Penugonda et al. | 380/2 |
| 2004/0186979 A1 * | 9/2004 | Janke et al. | 712/1 |
| 2008/0010537 A1 * | 1/2008 | Hayutin et al. | 714/38 |

FOREIGN PATENT DOCUMENTS

WO    WO-2004061666 A2    7/2004

OTHER PUBLICATIONS

European Search Report dated Jul. 26, 2010.

* cited by examiner

*Primary Examiner* — Sarai Butler
(74) *Attorney, Agent, or Firm* — Harness, Dickey & Pierce, P.L.C.

(57) ABSTRACT

The invention aims to provide a method and a system on chip able to detect at once hardware and software errors to prevent manipulations for retrieving cryptographic keys, inserting or suppressing instructions to bypass security processes, modifying programs or memory content etc. The system on chip comprises a core including at least two processors, registers, and a data consistency check module. The core is connected to at least one set of memories containing zones for instructions of a first program and of a second program, said instructions being to be executed respectively by the first and second processor, which respectively produce and store result data into the registers and the memories. The data consistency check module is configured to verify conformity of the produced result data by comparing a test result obtained by carrying out a predetermined function F over one of the first or second result data with the corresponding second or first result data and to continue execution of instructions of each program when the comparison is successful, or stop execution when the comparison shows an error.

15 Claims, 3 Drawing Sheets

METHOD FOR CHECKING DATA CONSISTENCY IN A SYSTEM ON CHIP

CROSS REFERENCE TO RELATED APPLICATION

This application claims priority under 35 U.S.C. Section 119 to European Patent Application No: EP10157014.1 entitled "Method for checking data consistency in a system on chip" filed Mar. 19, 2010, the contents of which are hereby incorporated by reference herein.

FIELD OF THE INVENTION

The present invention relates to the domain of software protection and security, and more particularly to a system on chip having means for at once rendering software tamper-proof and allowing high secure as well as high performance processing.

TECHNICAL BACKGROUND

In the domain of secure data processing, it is necessary to provide a tamper-resistant environment within which the processing can occur in a secure manner without lowering too much the performance in terms of reliability and efficiency.

A well known solution used to solve security problems was focused on protecting in a secure manner the hardware device containing the software necessary for the device functioning. The notion of tamper-proof was limited to such hardware which was difficult to open or once opened would destroy the processor and memory chip on which the secure software resided. However, it is generally recognized that software techniques for achieving application security offer more flexibility and lower cost particularly when hardware and software protection are combined.

A typical system on which application programs run generally comprises processing units, a plurality of peripherals and memories. In most cases where security is required, data is encrypted to be kept secure, i.e. working data or executable processing instructions or code, is encrypted. Encryption is usually done within a security module associated to a user unit such as a pay television set top box, a mobile equipment, a personal computer or any other device requiring security for functioning with payload or sensitive services. The security module can be implemented in a variety of manners such as on a microprocessor card, on a smartcard or any electronic module in the form of a badge or key. These modules are generally portable and detachable from the host user unit and are designed to be tamper-proof. The most commonly used form has electrical contacts, but contactless versions of type ISO 14443 also exist. Another implementation of the security module consists either of a directly soldered integrated circuit inside the user unit or a circuit on a socket or connector such as a SIM (Subscriber Identity Module) module. The security module may also be integrated on a chip which has another function e.g. on a descrambling module or on a microprocessor module of a pay television set top box. The security module can also be implemented as software.

In spite of the use of security modules and advanced encryption techniques, secure processing systems still represent a significant attraction for attempts at breaching security. Techniques used to bypass security of such systems include, for example, the reverse engineering of the hardware involved or the dynamic or static analysis of software used therein and the subsequent tampering with such software. By static analysis it is meant some form of disassembly or decompilation of non-executing code. By dynamic analysis it is meant analyzing during running of the program, i.e. by observing signals at certain contacts of the chip. Such analysis may lead to tampering whereby the software is modified by, for example, performing a branch-jamming attack wherein an unconditional jump is introduced in place of a conditional jump thus forcing a branch to execute when the current conditions do not prescribe such execution. Typically, such an attack would force a program to bypass an authentication step like serial number or password checking for example.

High reliability applications provide arrangements where a pair of processors are executing the same program instructions and verify each other conformity of results. If an error is detected, a module for correcting the software error is activated. Some examples are disclosed in following documents:

U.S. Pat. No. 5,915,082A1 describes a lockstep processor system which has error isolation built into the system and provides, in a large number of instances of detected error, high speed recovery with only small changes to current lockstep processor systems. The lockstep processor system adds error detection, isolation, and recovery logic to one or more lockstep processor system functions; namely, control outputs, processor inputs, busses, memory address busses, and memory data busses. Each processor notifies the other processor if it has detected an error, isolates the failure, and initiates recovery actions. To ensure that the processors are synchronized from a cycle perspective, a common clock source is used to drive both processors.

U.S. Pat. No. 6,604,177B1 discloses a processing system including a pair of processor coupled in a lockstep arrangement. The pair of processors is coupled to a storage element that is external to the both of them. Each processor executes an instruction stream that is identical to that executed by the other. Dissimilar information can be exchanged between the processors by each writing the information they wish to exchange to a first storage location with identical instructions. Although both processors execute the write with the same address, the information written by one of the processors is redirected to a second storage location. Each processor then reads the first and second storage locations to retrieve information supplied by the other processor. Now each processor has a copy of the other's data while staying in lockstep.

WO2004/061666 describes a processor having first and second execution cores that operate in a redundant (FRC) mode, an FRC check unit to compare results from the first and second execution cores, and an error check unit to detect recoverable errors in the first and second cores. The error detector disables the FRC checker, responsive to detection of a recoverable error. If an error reaches error detector from either core, recovery module is activated to implement a recovery routine. Recovery can be implemented with relatively low latency by hardware, software, firmware or some combination of these.

US2004/0186979A1, discloses a processor, having a first calculating unit, a second calculating unit and a control means for controlling the two calculating units such that they operate selectively in a high-security mode of operation processing complementary data or in a parallel mode of operation processing independent data or in a security mode of operation processing the same data, or that they are in a power-saving mode of operation, wherein one of the calculating units is switched off.

U.S. Pat. No. 6,615,366B1 describes a processor having dual execution cores that may be switched dynamically between operating in a high reliability mode and a high Performance mode. The execution cores process identical instructions in lock step, when the processor is operated in a high reliability mode. The execution cores may process different instructions when the processor is operated in a high performance mode. The processor may be switched dynamically between the high performance (HP) and high reliability (HR) modes. For one embodiment, the processor is switched between HP and HR modes under software control. Each execution core enters a ready state when it executes an HP-to-HR mode switch Instruction (S HR), and the processor switches from HP to HR mode when both execution cores have entered the ready state. For another embodiment, the processor includes a check unit that is activated in HR mode and deactivated in HP mode. The check unit compares the execution results generated by the first and second execution cores when it is activated, and signals an error when the execution results do not match. When an error is signaled, the processor may replay only the instructions that triggered the error and the issued operations that depend on it.

U.S. Pat. No. 6,199,171 B1 discloses a method and implementing system for handling detected faults in a processor to improve reliability of a computer system. An exemplary fault-tolerant on-line transactional computer system includes first and second on-line transactional processors connected to an input/output processor through a system bus. Transaction results are stored in local processor buffers and at predetermined batch intervals, the stored transactions are compared. The matched transaction results are flushed to data store while unmatched transactions are re-executed. If the same errors do not occur during a re-execution, the errors are determined to be transient and the transaction results are flushed to storage.

U.S. Pat. No. 6,839,849B1 discloses a smart integrated circuit characterized by a main processor and an operating system executing a main program for constituting a main task-performing process, at least one secondary processor capable of concurrently executing at least one secondary program for constituting at least one task-performing process, power supply circuits common to the processors and means for ensuring that the secondary processor or processors with similar power and different operating signatures are executed concurrently with the main process by continuously or intermittently inducing, in the power supply circuits, power disturbances that are superimposed on those of the main process so as to produce a continuous or intermittent scrambling.

The above mentioned systems and methods are rather focused on high reliability and high performances than on high security involving software tamper proof features.

SUMMARY OF THE INVENTION

The invention aims to provide a method and a system on chip able to detect at once hardware and software errors to prevent manipulations for retrieving cryptographic keys, inserting, suppressing or modifying instructions to bypass security processes, modifying memory content etc. The system on chip ensures thus high performance and high security data processing. If an error is detected, the process is preferably stopped or interrupted rather than the error is corrected and the current process continues.

These aims are achieved by a method for checking data consistency in a system on chip comprising a core including at least two processors, registers, and a data consistency check module linking the two processors, the core being connected to at least one set of memories containing zones for instructions of a first program and zones for instructions of a second program, each program accessing to data, said instructions being to be executed respectively by the first and second processor, which respectively produce and store result data into the registers and the memories, the method comprising steps of:

executing at least one instruction of the first program by the first processor, producing first result data, executing at least one instruction of the second program by the second processor, producing second result data distinct from the first result data, applying, by the data consistency check module, a predetermined function either over the first result data or the second result data to obtain a test result, comparing by the data consistency check module, the test result previously obtained either with the corresponding second result data or first result data, continuing execution of instructions of each program by respectively the first and second processor when the comparison between a test result and the corresponding result data is successful, stopping execution of instructions of each program by respectively the first and second processor when the comparison shows an error.

A further object of the invention is a system on chip comprising a core including at least two processors, registers, and a data consistency check module linking the two processors, the core being connected to at least one set of memories containing zones for instructions of a first program and zones for instructions of a second program, each program accessing to data, said instructions being to be executed respectively by the first and second processor, which respectively produce and store result data into the registers and the memories, the system on chip is characterized in that:

the first processor is configured to execute at least one instruction of the first program and to produce first result data, the second processor is configured to execute at least one instruction of the second program and to produce second result data distinct from the first result data, the data consistency check module is configured to obtain a test result by applying a predetermined function either over the first result data or the second result data, to compare said test result either with the corresponding second result data or first result data, the data consistency check module comprises means for continuing execution of instructions of each program by respectively the first and second processor when the comparison is successful, and stopping execution of instructions of each program by respectively the first and second processor when the comparison shows an error.

According to the method and the features of the system on chip of the invention, the data consistency check module preferably stops the execution of the program by the processors when the result of the comparison between the result data shows an error. In this case, the first result data is different from the second result data i.e. the result data are not related by the predetermined function and therefore not usable by the programs of either the first or second processor. The errors are preferably logged in a register of either the first processor or the second processor which may generate an interrupt signal stopping the current process or resetting the processors. In an embodiment, a minimum number of errors could be tolerated by the system before program execution is stopped.

BRIEF DESCRIPTION OF THE FIGURES

The invention will be better understood with the following detailed description, which refers to the attached figures given as non-limitative examples.

DETAILED DESCRIPTION OF THE INVENTION

Figure 1:
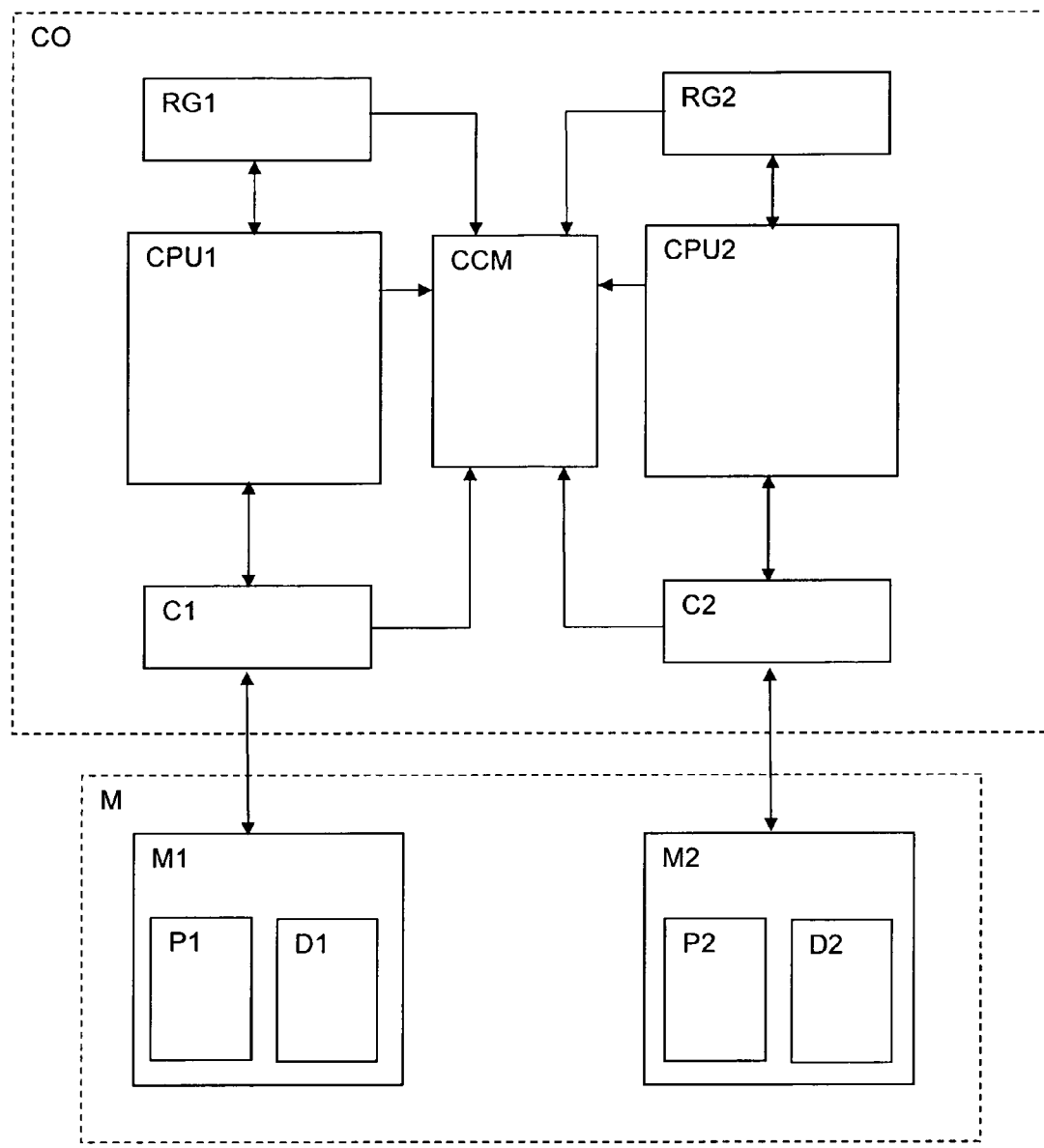
FIG. 1 shows a general block diagram of a core of a system on chip comprising two processors with a data consistency check module linking the two processors. The core is connected to memories containing a first and a second program executed respectively by the first and second processor.

The block diagram of FIG. 1 illustrates a core (CO) of an example of a system on chip SoC connected to a set of memories (M) generally integrated in the system on chip SoC. The core (CO) comprises at least two processors (CPU1, CPU2) each associated to a cache memory (C1, C2) and registers (RG1, RG2) which stores result or status data of the processor (CPU1, CPU2). A consistency check module (CCM) links together the two processors (CPU1, CPU2) and their associated registers (RG1, RG2) and cache memories (C1, C2). This module (CCM) checks consistency of various data and parameters produced during execution of program (P1, P2) instructions by the processors (CPU1, CPU2).

The memories (M) which may form separated sets (M1, M2) connected to each processor (CPU1, CPU2) or a common set connected to both processors (CPU1, CPU2) according to the implementation of the system on chip in a device include zones for program (P1, P2) instructions and zones for data (D1, D2). The data (D1, D2) may be either common to both programs (P1, P2) or each program (P1, P2) accesses to its own data set D1 or D2.

The term instruction designates the most rudimentary commands executable by a processor. A program or set of instructions is the list of all the basic commands written in machine language. An instruction usually comprises a statement and variables or parameters used to carry out calculations, move or jump from a memory or register address to another, query data from a database, store data at an address of memory or register, test on variables values, declare and set values intervening in various operations executed by the statement, etc. The variables may take values retrieved from program data set D1 or D2, or from results obtained by operations carried out with preceding instructions. They may also consist of status variables taken from registers, values provided by external devices or peripherals via a bus connected to the system on chip SoC, as well as addresses of memories or registers where to store or retrieve data.

The data consistency check module (CCM) performs tests to determine if the data submitted by the processors (CPU1, CPU2) are correct i.e. data produced at execution of the program instructions satisfy predefined comparison criteria or pass tests such as CRC (Cyclic Redundancy Check), parity bit check or other error detecting processes.

In an exemplary secure functioning mode, the first processor (CPU1) runs a first program P1 including instructions (IN11 ... IN1$n$) retrieved from the memory M1. It accesses also to data D1 and produces first result data (R11 ... R1$n$) all stored in further memory zones of the memory set M1 or in the registers (RG1, RG2).

As the first processor (CPU1), the second processor (CPU2) runs a second program P2 including instructions (IN21 ... IN2$n$) by accessing data D2 and produces second result data (R21 ... R2$n$). The execution of the program instructions is preferably carried out in a synchronous mode i.e. when the first processor CPU1 executes an instruction of the program P1, the second processor CPU2 executes in parallel an instruction of the program P2 as illustrated by arrows in FIG. 2.

In a preferred embodiment, the data consistency check module CCM calculates a test result F(R1$n$) or F(R2$n$) by applying the function F either over the first result data R1$n$ produced by the execution of the first program instructions IN1$n$ or over the second result data R2$n$ produced by the execution of the second program instructions IN2$n$. This test result F(R1$n$) or F(R2$n$) thus obtained is compared with the corresponding second or first result data R2$n$ or R1$n$. If a match is found i.e. the comparison is successful, the programs instructions execution continues. Otherwise, if an error is detected by a difference between the calculated test result F(R1$n$) or F(R2$n$) and the corresponding result data R2$n$ or R1$n$, the first or the second program P1, P2 execution is stopped.

This error is preferably recorded in a register (RG1, RG2) either of the first processor (CPU1) or the second processor (CPU2) for accounting and/or status history purposes. In case of an error, the processors may also be reset and the registers emptied.

According to an embodiment, a certain number of errors can be cumulated until a predefined threshold of a maximum number of errors beyond which either the first processor (CPU1) or the second processor (CPU2) stops program execution. This threshold may be stored in a register (RG1, RG2) and depends on the severity of the security attributed to the programs (P1, P2) and to their result data (R11 ... R1$n$), (R21 ... R2$n$).

In an example, the first and the second program P1, P2 include instructions which statements and variables are specific to the type of processor, but producing result data R1$n$, R2$n$ so that the first and second result data are related by a function F such as for example R2$n$=F(R1$n$) or R1$n$=F(R2$n$). The function F may represent an XOR operation, a logical inversion operation or any other logical operation made on a result data to obtain the corresponding result data. Any other mathematical function or cryptographic function can also be envisaged as relation between the result data R1$n$, R2$n$.

The result data thus produced and stored in registers or memories of the system on chip are systematically verified by the data consistency check module CCM. The verified result data consist as well of intermediate results obtained when an instruction is executed as of status or signaling data indicating how further instructions have to be executed.

Several further configurations may be possible for the structure of the respective instructions IN1$n$ or IN2$n$ of the program P1 or P2 executed by the processors (CPU1, CPU2), namely:

The first and the second program P1, P2 include instructions IN1$n$, IN2$n$ with the same statements but using different variables. The data consistency check module (CCM) verifies the result data by referring to the relations between the variables used by the first and second program instructions IN1$n$, IN2$n$.

The first and the second program include instructions which statements are specific to the type of processor, but using the same variables. The data consistency check module (CCM) verifies the result data by referring to the relations between the statements and variables used by the first and second program instructions.

For example the first program P1 includes instructions IN1$n$ with opposite statements relative to the statements of the instructions IN2n of the second program P2. Statements as additions in the first program instructions IN1n become subtractions in the instructions IN2n of the second program P2, the corresponding variables having an opposite signs. The result data R1n, R2n thus obtained by execution of program P1 respectively P2 are similar except for the sign. The verification made by the data consistency check module (CCM) may then be based on the equivalency of the absolute value alone or on the conformity of the value with sign of the result data R1n, R2n obtained by each program instructions IN1n, IN2n.

In another example, the binary code of the instructions IN1n of first program P1 may be inverted relatively to the binary code of the instructions IN2n of the second program P2. The binary code of the result data R1n, R2n produced by each instruction IN1n, IN2n will be also inverted and checked, according to this criterion, by the data consistency check module (CCM).

The data consistency check module (CCM) is preferably activated or deactivated thanks to specific instructions included in the first or second program (P1, P2) executed by the first respectively the second processor (CPU1, CPU2). When activated, the data consistency check module (CCM) determines a mode of synchronized functioning of the first and second processors (CPU1, CPU2) or secure mode while the deactivated data consistency check module (CCM) determines a mode of independent functioning of said first and second processors (CPU1, CPU2) or high performance mode.

Figure 2:
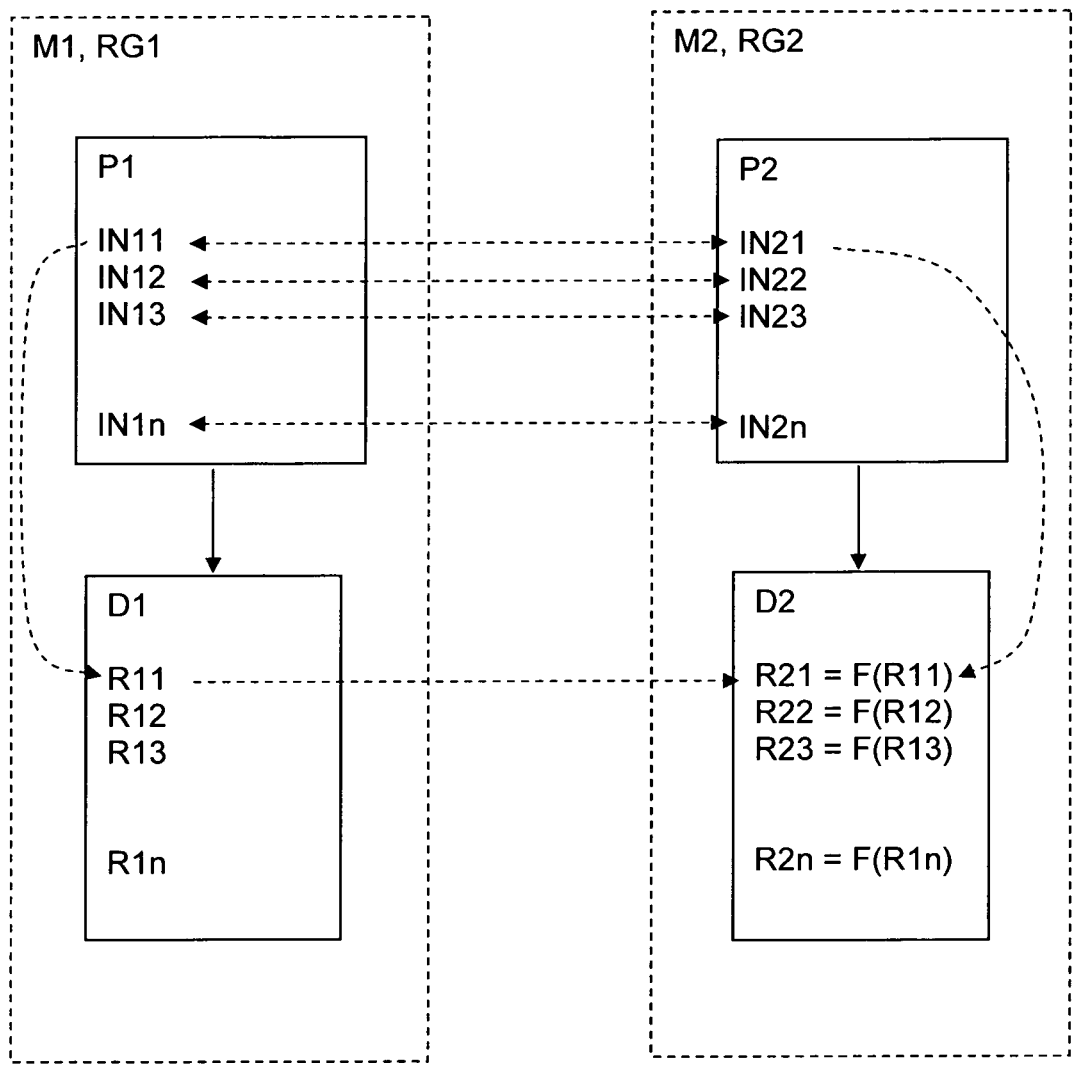
FIG. 2 shows a block diagram showing instructions of a first program and instructions of a second program respectively executed by the first and second processor, and producing result data related by a predetermined function.

According to an embodiment, an automatic verification procedure may be performed at each result data R1n, R2n produced by the program instructions IN1n, IN2n either one by one as shown in FIG. 2 or by batches. In this case a set of instructions (batch) is executed by each processor (CPU1, CPU2) and the result data R1n, R2n produced by the set of instructions is verified by the data consistency check module (CCM).

Figure 3:
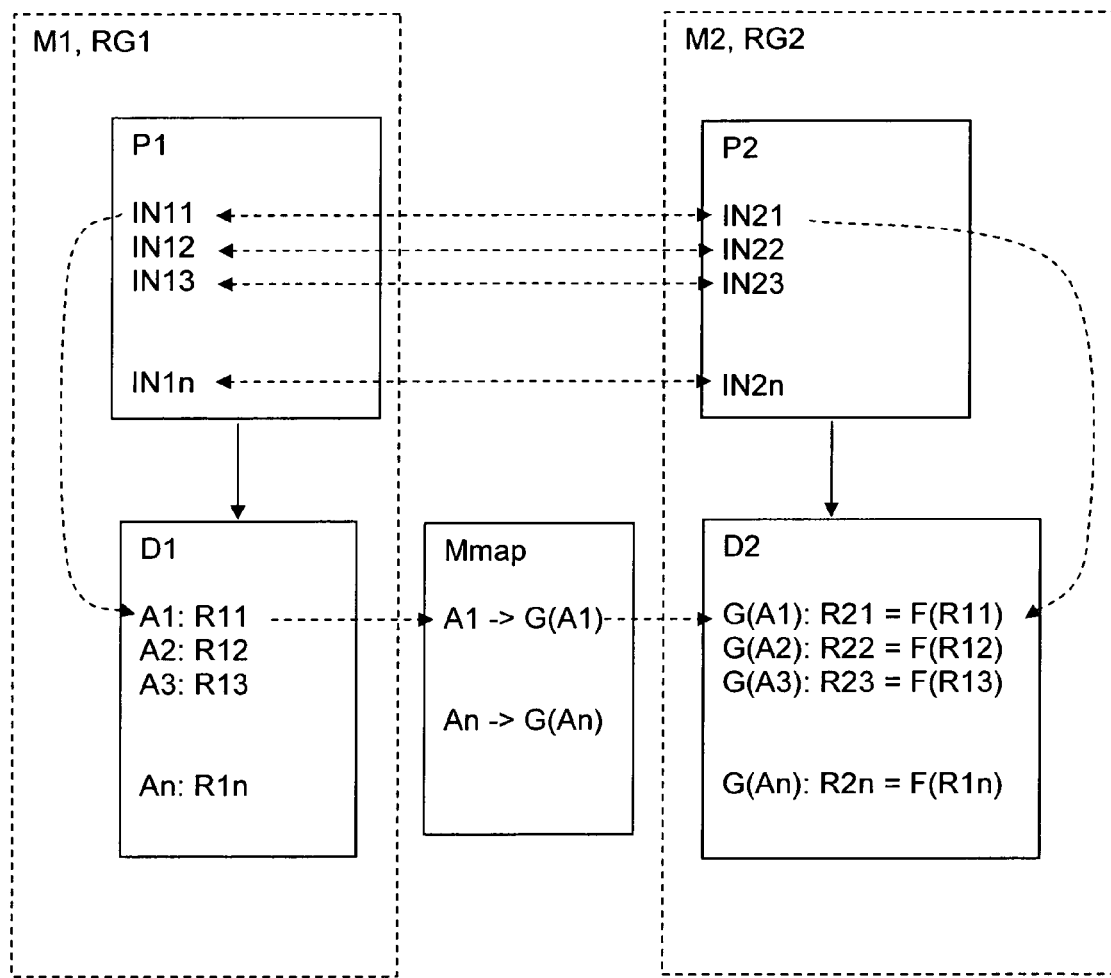
FIG. 3 shows a block diagram of an embodiment where the memory or registers addresses of the second result data are related to the first result data by a function carried out by a mapping module.

According to an embodiment illustrated by FIG. 3, the result data (R11 ... R1n) and (R21 ... R2n) produced by the instructions of either the first program P1 or second program P2 are stored in memory and registers M2 at addresses defined by a mapping module Mmap linking respectively memory and registers M1, RG1, M2, RG2 used by the first and second processor (CPU1, CPU2). This module Mmap may be a software and/or hardware memory management module including a correspondence table or a function G relating the addresses (A1, ... An) of the first result data (R11, ... R1n) to the addresses (G(A1), ..., G(An)) of the second result data (R21, ... R2n).

For example, the result data R2n produced by the instructions IN2n of the second program P2 executed by the second processor CPU2 are stored at memory or register addresses defined by a predetermined mapping applied on each memory or register address where are stored the corresponding result data R1n produced by the instructions IN1n of the first program P1 executed by the first processor CPU1.

The mapping may define a predetermined shift SH between the memory or registers addresses where are stored the result data R1n and R2n. R1n is stored at address An while R2n is stored at address An+SH, the shift SH being for example constant for all addresses storing result data (R11 ... R1n) and (R21 ... R2n). In a further embodiment the shift may be different for the registers addresses and the memory addresses.

The mapping could also consist of a predetermined function G carried out on each address (A1 ... An) where are stored the result data (R11 ... R1n) produced by the instructions (IN1, ..., IN1n) of the first program P1 to obtain the addresses (G(A1) ... G(An)) where are stored the result data (R21 ... R2n) produced by the instructions (IN2, ..., IN2n) of the second program P2. As in the previous example of a shift SH between the addresses, the function G could be different for the registers addresses and the memory addresses. FIG. 3 illustrates an implementation where the memory or registers addresses of the second result data are related to the first result data by a function G carried out by the mapping module Mmap.

In a similar way than the function F relating the result data, the function G may represent XOR operation, an inversion operation or any other logical operation made on a memory or register address to obtain the corresponding address. Any other mathematical function or cryptographic function can also be envisaged as relation between the memory addresses.

In the embodiments including the mapping of the result data (R11 ... R1n) and (R21 ... R2n) memory or registers addresses (A1, ... An), (G(A1), ... G(An)), the data consistency check module CCM determines the address of the result data with the memory mapping module Mmap in order to localize the suitable result data to verify. These steps are thus carried out before obtaining by the data consistency check module (CCM), a test result F(R1n) or F(R2n) by applying the predetermined function F either over the first result data R1n or the second result data R2n.

The invention also concerns a system on chip (SoC) comprising a core (CO) including at least two processors (CPU1, CPU2), registers (RG1, RG2), and a data consistency check module (CCM) linking the two processors (CPU1, CPU2), the core (CO) being connected to at least one set of memories (M) containing zones for instructions of a first program (P1) and data (D1) and zones for instructions of a second program (P2) and data (D2), said instructions being to be executed respectively by the first and second processor (CPU1, CPU2), which respectively produce and store result data (R1n, R2n) into the registers (RG1, RG2) and the memories (M). The system on chip foreseen to operate in a high security and/or in a high performance mode is configured in such a way to be able to carry out the above described steps of the method including all or parts of the different embodiments or options.

The invention claimed is:

1. A method for checking data consistency in a system on chip comprising a core including at least two processors, registers, and a data consistency check module linking the two processors, the core being configured to connect to at least one set of memories containing program zones for first instructions of a first program and program zones for second instructions of a second program, each program being configured to access data stored in data zones of the memories, said first and second instructions to be executed by the first and second processor, respectively, to produce and store result data into the registers or the memories, the method comprising:

executing at least one instruction of the first program by the first processor to produce first result data, executing at least one instruction of the second program by the second processor to produce second result data distinct from the first result data, applying, by the data consistency check module, a function either over the first result data or the second result data to obtain a test result, wherein the applying a function applies one of a logical operation, a mathematical function, and a cryptographic function such that the obtained test result is a modified version of one of the first result data and the second result data, comparing, by the data consistency check module, the obtained test result either with the corresponding second result data or first result data, continuing execution of instructions of each program by the first and second processor when the comparison between the test result and the corresponding result data is successful, and stopping execution of instructions of each program by the first and second processor when the comparison shows an error.

2. The method according to claim 1, wherein the stopping stops the execution of the program by the processors at the first error occurred during comparison of the result data and the corresponding test results.

3. The method according to claim 1, further comprising:

activating or deactivating the data consistency check module by a specific instruction included in the first or second program executed by a corresponding one of the first and second processors, determining, if the data consistency check module is activated, a mode of synchronized functioning of the first and second processors, and determining, if the deactivated data consistency check module is deactivated, mode of independent functioning of said first and second processors.

4. The method according to claim 1, wherein the executing of at least one instruction of the first program by the first processor is synchronized with the executing of at least one instruction of the second program by the second processor, and the comparing result data with the corresponding test results occurs at each instruction execution.

5. The method according to claim 1, wherein the result data produced by the second instructions of the second program executed by the second processor are stored at memory or register addresses defined by a mapping applied on each memory or register address where the corresponding result data produced by the first instructions of the first program executed by the first processor are stored.

6. The method according to claim 5, wherein the mapping comprises a shift between the addresses where the first result data are stored and the addresses where the second result data are stored.

7. The method according to claim 5, wherein the mapping comprises a function relating the addresses where the first result data are stored and the addresses where the second result data are stored.

8. The method according to claim 5, further comprising:

determining the memory or register addresses of the result data and identifying, by the data consistency check module, suitable result data to verify, said determining and identifying being carried out before the applying a function.

9. The method according to claim 1, wherein the first and the second program include instructions with the same statements but using different variables.

10. The method according to claim 1, wherein the first and the second program include instructions which statements and variables are specific to the type of a corresponding one of the first second processors.

11. The method according to claim 1, wherein the first and the second program include instructions which statements and variables are specific to the type of processor, the result data produced by the executing the instructions being related by the function.

12. A system on chip, comprising:

a core including,
at least two processors,
registers, and
a data consistency check module linking the two processors, the core being configured to connect to at least one set of memories containing zones for first instructions of a first program and zones for second instructions of a second program, each program being configured to access data stored in data zones of the memories, said first and second instructions to be executed by the first and second processor, respectively, to produce and store result data into the registers or the memories, wherein, the first processor is configured to execute at least one instruction of the first program to produce first result data, the second processor is configured to execute at least one instruction of the second program to produce second result data distinct from the first result data, the data consistency check module is configured to obtain a test result by applying a function either over the first result data or the second result data, and to compare said test result either with the corresponding second result data or first result data, wherein the data consistency check module is configured to apply one of a logical operation, a mathematical function, and a cryptographic function as the function such that the obtained test result is a modified version of one of the first result data and the second result data, and the data consistency check module is configured to continue execution of instructions of each program by the first and second processor when the comparison is successful, and stop execution of instructions of each program by the first and second processor when the comparison shows an error.

13. The system on chip according to claim 12, wherein the data consistency check module is configured to stop the execution of the program by the processors at the first error occurred during comparison of the result data and the corresponding test results.

14. The system on chip according to claim 12, further comprising a memory mapping module including a correspondence table or a function relating the addresses of memory or registers where the first and second result data are stored.

15. A method for checking data consistency in a system on chip comprising a core including at least two processors, registers, and a data consistency check module linking the two processors, the data consistency check module being configured to perform tests to determine if data produced by the at least two processors at execution of program instructions satisfy desired comparison criteria or pass consistency tests or other error detecting processes, the core being configured to connect to at least one set of memories containing program zones for first instructions of a first program and program zones for second instructions of a second program, each program being configured to access data stored in data zones of the memories, said first and second instructions to be executed by the first and second processor, respectively, to produce and store result data into the registers or the memories, the method comprising:

executing at least one instruction of the first program by the first processor to produce first result data, storing said first result data at desired addresses of the memory or register, executing at least one instruction of the second program by the second processor to produce second result data distinct from the first result data, storing said second result data at addresses of the memory or register defined by a desired mapping applied on each memory or register address where the corresponding first result data are stored, applying, by the data consistency check module, a function either over the first result data or the second result data to obtain a test result, wherein the applying a function applies one of a logical operation, a mathematical function, and a cryptographic function such that the obtained test result is a modified version of one of the first result data and the second result data, determining by the data consistency check module the memory or register addresses of the result data and identify suitable result data to verify, comparing, by the data consistency check module, the obtained test result either with the corresponding second result data or first result data, continuing execution of instructions of each program by the first and second processor when the comparison between the test result and the corresponding result data is successful, and stopping execution of instructions of each program by the first and second processor when the comparison shows an error.

* * * * *